United States Patent [19]
Lenel et al.

[11] 3,850,760
[45] Nov. 26, 1974

[54] SEPARATION OF ISOPROPYL-AMINES BY PLURAL STAGE DISTILLATION

[75] Inventors: Paul Otto Lenel; William Featherstone, both of Stockton-on-Tees, England

[73] Assignee: Imperial Chemical Industries Limited, London, England

[22] Filed: Jan. 15, 1973

[21] Appl. No.: 323,350

[52] U.S. Cl............ 203/84, 203/99, 260/583 N, 260/585 B
[51] Int. Cl............ B01d 3/00, C07c 85/02
[58] Field of Search....... 260/585 B, 583 N; 203/99, 203/84, 71

[56] References Cited
UNITED STATES PATENTS

| | | | |
|---|---|---|---|
| 2,053,193 | 9/1936 | Guinot | 260/585 B |
| 2,180,006 | 11/1939 | Hasche et al. | 260/583 N |
| 2,348,683 | 5/1944 | McKenna | 260/583 N |
| 2,512,584 | 6/1950 | Smith | 260/583 N |
| 2,512,585 | 6/1950 | Smith | 260/583 N |
| 2,713,597 | 7/1955 | Yalowitz et al. | 260/583 N |

Primary Examiner—Wilbur L. Bascomb, Jr.
Attorney, Agent, or Firm—Cushman, Darby & Cushman

[57] ABSTRACT

Operation of a series of three distillation columns in two successive sequences to recover mono- and di-isopropylamine from their mixture with acetone and other impurities.

8 Claims, 1 Drawing Figure

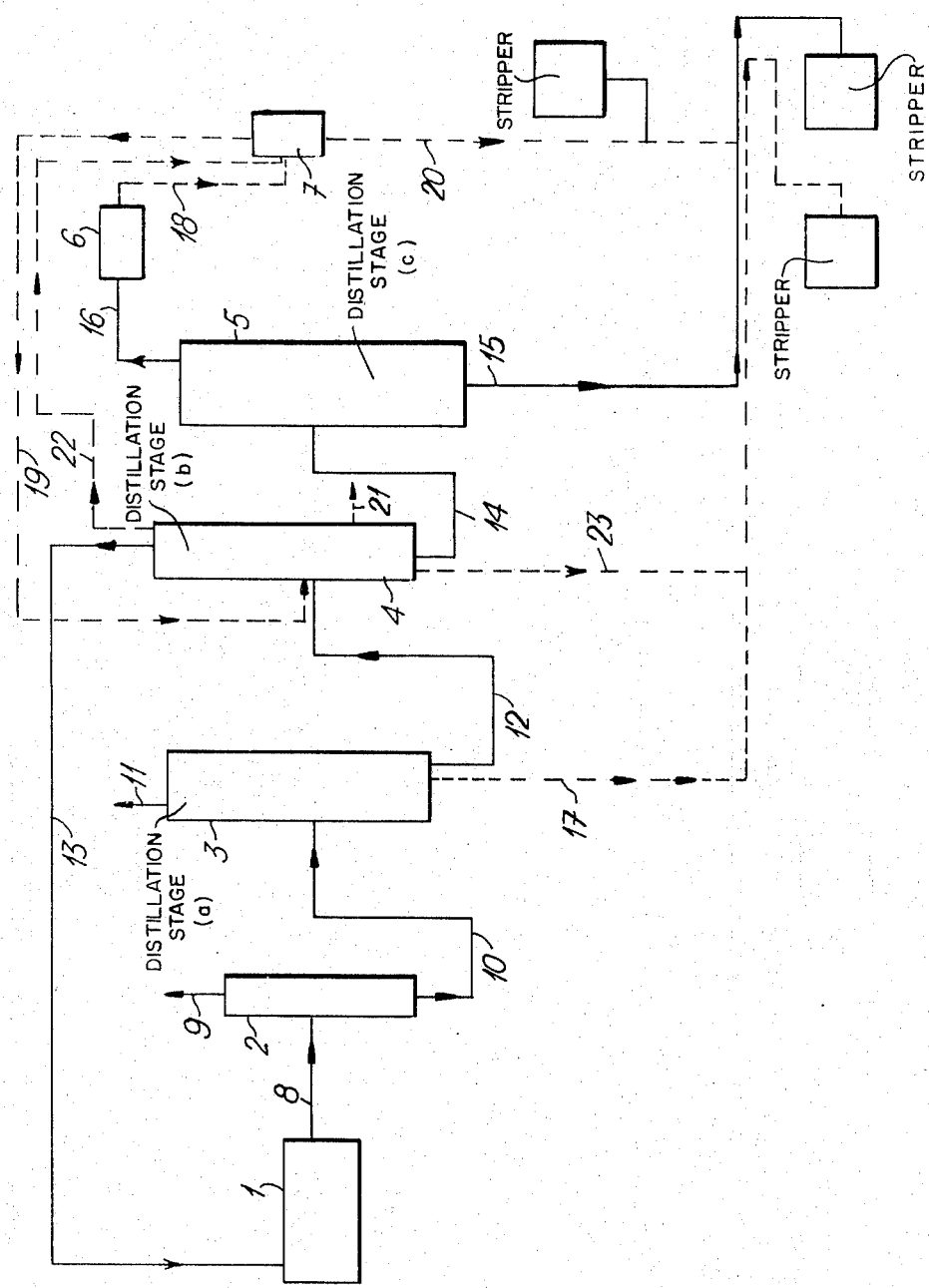

SEPARATION OF ISOPROPYL-AMINES BY PLURAL STAGE DISTILLATION

This invention relates to the recovery of mono- and di-isopropylamine from a reaction stream containing these compounds and various impurities including acetone.

In certain processes for the manufacture of isopropylamines by the reaction of ammonia and isopropanol the reactor consists mainly of mono- and di-isopropylamines, water and unchanged reactants. Acetone is notably absent and the desired products may be obtained by a relatively easy series of distillation steps. The product stream is distilled to remove ammonia in a first still, and mono-isopropylamine in a second still. The bottoms from this latter still contain isopropanol, water and di-isopropylamine. In a third still, isopropanol and some water are removed as bottoms product and di-isopropylamine as its azeotrope with water as the overhead product. The overhead product is then phase split at about 65° to yield a water rich phase and an amine rich phase. The latter is distilled, pure di-isopropylamine being removed as a side stream and a mixture of water and di-isopropylamine being removed overhead for recycling to the phase-splitting stage. In this way, pure mono- and di-isopropylamine are readily obtained provided acetone is absent from the reaction product.

We have now found that acetone and other impurities are formed when certain catalysts, for example, nickel-based catalysts, are used in the manufacture of isopropylamines from ammonia and isopropanol. We have further found that the simple distillation method normally used to separate mono- and di-isopropylamine from each other and from the other reaction products loses a considerable amount of its efficiency when acetone is present in the reaction products. The acetone tends to be carried over into the di-isopropylamine distillation stage but it is not readily separable from the di-isopropylamine except by incorporating a further distillation stage. A further difficulty which occurs when acetone is present is that a much larger proportion of mono-isopropylamine is carried forward to the di-isopropylamine distillation stage than is the case when acetone is absent. These difficulties considerably reduce the efficiency of the process and lower its economic attractiveness. Although additional distillation steps would resolve these difficulties such a solution to the problem is not attractive economically.

We have now surprisingly found that acetone and other impurities may be efficiently separated from the desired amine products by a process which uses the same number of stills as has been used in the separation process operated when acetone has been absent.

Accordingly, the present invention is a process for the separation of mono- and di-isopropylamine from a reaction stream containing these amines and acetone which comprises operating a series of three distillation stages in two successive sequences of operations, such that in the first sequence, a. the reaction stream is distilled in a first distillation stage, pure mono-isopropylamine being removed overhead and the bottoms product being passed to a second distillation stage, b. acetone and the remaining mono-isopropylamine is removed as an overhead product in the second distillation stage, the bottoms product comprising di-isopropylamine and water being passed to a third distillation stage, c. a mixture of water and di-isopropylamine is separated from the remaining impurities and removed overhead in a third distillation stage and stored, and in the second sequence, d. bottoms product from the first distillation stage is prevented, by recycling or other suitable means, from passing to the second distillation stage, e. the stored overhead product from stage (c) is phase separated and the fraction containing di-isopropylamine as a major proportion is fed to the second distillation stage, f. the second distillation stage is operated such that substantially pure di-isopropylamine is removed as a sidestream.

The reaction stream is likely to contain as contaminants besides acetone unchanged reactants, for example ammonia and isopropanol, water and other impurities, for example isopropylisopropylidene imine which is the reaction product of mono-isopropylamine and acetone.

Ammonia, if present, is conveniently removed in the conventional manner by a still immediately preceding the first distillation stage (a). The first distillation stage is conveniently operated at a reflux ratio in the range 5 : 1 to 15 : 1, most suitably of the order of 5 : 1.

In the first sequence of operations, the second distillation stage (b) is conveniently operated at a reflux ratio in the range 2 : 1 to 10 : 1 and most suitably of the order of 5 : 1.

The overhead product from distillation stage (b) comprises the major proportion of the acetone, almost all the mono-isopropylamine carried over from distillation stage (a), and a small amount of di-isopropylamine. This overhead product is most conveniently recycled to the process reactor.

The bottoms product from distillation stage (b) has been found to comprise mainly di-isopropylamine, isopropanol and water. This product passes to the third distillation stage (c) which is operated so that the isopropanol is removed as the bottoms product in admixture with water. The isopropanol can then be recovered as a water-isopropanol azeotrope in a stripper, if desired. The overhead product from the third distillation stage is a mixture of di-isopropylamine and water which contains little or no (0.1 percent) other impurities. This overhead product is stored. We have found that the third distillation stage is suitably operated at a reflux ratio in the range 15 : 1 to 25 : 1, preferably 20 : 1.

In the second sequence of operations of the process of the invention, the stored di-isopropylamine is separated from its mixture with water by distillation in the second distillation stage. It is, therefore necessary to divert the feed which passes to the second distillation stage in the first sequence of operations. This may be achieved by stopping the production of fresh product from the reactor until the stored di-isopropylamine/water mixture has been distilled. A more economical and attractive method is to continue the production of fresh product, separate the mono-isopropylamine from the reaction stream in the first distillation stage (a) and then pass the bottoms product from this still to a stripper where the components of the bottoms product may be crudely separated from one another and thereafter recycled for further use or treatment.

The stored di-isopropylamine/water mixture is first phase separated to obtain a di-isopropylamine-rich extract containing only a minor proportion of water. This extract is recycled to the second distillation stage which may be operated under the same conditions as in the first sequence of operations except that the preferred range of reflux ratio is 0.5 : 1 to 2 : 1, a suitable ratio being of the order of 1 : 1. Pure di-isopropylamine is removed from this distillation stage as a sidestream. Some di-isopropylamine is removed overhead as its azeotrope with water and recycled to the phase separation stage.

The invention will now be further described with reference to the accompanying drawing which is a schematic diagram of the process of the invention, the solid and broken lines representing the first and second sequences of operations respectively. EXAMPLE The reactor 1 is linked sequentially to a series of distillation columns 2, 3, 4 and 5. Distillation column 5 is linked to storage capacity 6 from which, in turn, stored product can be fed to a phase separator 7.

In operation, a process for the production of isopropylamines by the reaction of isopropanol and ammonia is carried out in reactor 1 and the reaction product stream is fed to column 2 along line 8. Column 2 is operated in a manner well known to those skilled in the art so that unreacted ammonia is removed overhead by line 9. The remainder of the reaction product stream emerges as bottoms product and is fed by line 10 to column 3. (The first distillation stage (a) ).

Column 3 is operated at a reflux ratio of 5 : 1 in order to remove pure mono-isopropylamine as the overhead product through line 11.

In the first sequence of operations, the bottoms product from column 3 comprising di-isopropylamine, water, isopropanol, acetone and other impurities together with some entrained mono-isopropylamine is fed by line 12 to column 4 (the second distillation stage (b) ). This column is operated at a reflux ratio of the order of 5 : 1, in order to remove the acetone and other impurities, the mono-isopropylamine entrained in the bottoms product from column 3, and a small amount of di-isopropylamine overhead by line 13 whence this mixture is recycled to reactor 1.

The bottoms product from column 4 contains substantially no acetone or other impurities nor mono-isopropylamine. The main components of the bottoms product are di-isopropylamine, water and unreacted isopropanol. The bottoms product is passed along line 14 to column 5 (distillation stage (c) ) which is operated at a reflux ratio of the order of 20 : 1 in order to separate the isopropanol from the di-isopropylamine. The isopropanol together with some water and a small amount of di-isopropylamine is removed as bottoms product along line 15 to a stripper (not shown). The overhead product from the column is removed to a storage 6 along line 16 and comprises a di-isopropylamine-water mixture, substantially free from impurities.

When a suitable quantity of di-isopropylamine-water mixture has been collected in storage capacity 6, the second sequence of operations is started. The bottoms product from column 3 is diverted along line 17 to a stripper (not shown) and the product in storage capacity 6 is passed along line 18 to phase separator 7. The phase separation is effected at 65°C and the di-isopropylamine-rich phase is removed overhead by line 19 to column 4. The water-rich phase containing a small amount of di-isopropylamine is fed by line 20 to a stripper (not shown).

In this second sequence of operations column 4 is operated at a reflux ratio of the order of 1 : 1. Pure di-isopropylamine is removed as a sidestream through line 21. The overhead product from column 4 comprises a di-isopropylamine-water azeotrope and is passed by line 22 to the phase separator 7. A small amount of bottoms product is fed by line 23 to a stripper (not shown), if desired after taking a purge to remove minor impurities.

In a typical process run, the composition of the various streams treated and removed from the distillation stages was as follows. All percentages shown are by weight and the following contractions are used:

IPA — isopropanol
MIPA — mono-iso-propylamine
DIPA — di-isopropylamine
IIDI — isopropylisopropylidene imine
ND — not detected.

| Column | Product Stream | % MIPA | % DIPA | % Acetone | % Water | % NH₃ | % IPA | % IIDA |
|---|---|---|---|---|---|---|---|---|
| 3 | Overhead | >99.5 | <.005 | 0.01 | <0.1 | <0.1 | <0.005 | <0.1 |
| 3 | Bottoms | 8.0 | 21.7 | 1.0 | 53 | <0.1 | 16.0 | 0.3 |
| 4 (1st sequence) | Overhead | 72 | 10 | 6.5 | 1.0 | | 0.5 | 10 |
| 4 (1st sequence) | Bottoms | ND | 24 | ND | 58 | | 18 | <0.1 |
| 5 | Overhead | | 90.4 | | 9.5 | | <0.2 | |
| 5 | Bottoms | | <0.1 | | | | | |
| Phase Separator | Amine rich phase | | 95.7 | | 4.3 | | | |
| 4 (2nd sequence) | Sidestream | | >99.5 | | <0.1 | | | |
| 4 (2nd sequence) | Overhead | | 90.5 | | 9.5 | | | |

The process of the invention has enabled a very satisfactory separation of mono-isopropylamine and di-isopropylamine to be made from each other and from acetone. The table shows that the process allows the two amine products to be obtained at as high degrees of purity as are achieved when acetone is not present in the reaction product stream without the need to use additional high performance distillation columns.

We claim:

1. A process for the separation of mono- and di-isopropylamine from a reaction stream containing these amines, acetone and water which comprises the following steps i. distilling the reaction stream in a first distillation stage (a) so as to take off pure mono-isopropylamine overhead and passing the bottoms product to a second distillation stage (b) in which, ii. acetone and the remaining mono-isopropylamine is removed as an overhead product and the bottoms product comprising di-isopropylamine and water is passed to a third distillation stage (c), iii. in which a mixture of water and di-isopropylamine is taken off overhead and sent to storage following which, iv. the mixture of water and di-isopropylamine is phase-separated to give a di-isopropylamine rich phase and a water rich phase and at predetermined time intervals the di-isopropylamine rich phase is recycled as feed to the second distillation stage (b) at which time the bottoms product from (a) is recycled as feed to (a) or stored or sent to a separate stripper and substantially pure di-isopropylamine is removed as a sidestream from distillation stage (b).

2. A process as claimed in claim 1 in which the overhead product from distillation stage (b) is recycled to a process reactor for the production of amines from which the reaction stream is derived.

3. A process as claimed in claim 1 in which the reaction stream also contains isopropanol, and bottoms product from distillation stage (c) comprising passing isopropanol and water to a stripper from which isopropanol is recovered as an azeotrope with water.

4. A process as claimed in claim 1 in which in step (iv) the overhead product from the second distillation stage (b) comprising a di-isopropylamine-water azeotrope is recycled to the phase separation stage.

5. A process as claimed in claim 1 in which the first distillation stage (a) is operated at a reflux ratio in the range 5 : 1 to 15 : 1.

6. A process as claimed in claim 1 in which the second distillation stage (b) in step (ii) is operated at a reflux ratio in the range 2 : 1 to 10 : 1.

7. A process as claimed in claim 1 in which the third distillation stage (c) is operated at a reflux ratio in the range 15 : 1 to 25 : 1.

8. A process as claimed in claim 1 in which the second distillation stage (b) in step (iv) is operated at a reflux ratio in the range 0.5 : 1 to 2 : 1.

* * * * *

UNITED STATES PATENT OFFICE
CERTIFICATE OF CORRECTION

Patent No. 3,850,760      Dated November 26, 1974

Inventor(s) Lenel, Paul Otto, and Featherstone, William

It is certified that error appears in the above-identified patent and that said Letters Patent are hereby corrected as shown below:

IN THE HEADING:

After line "[21]", insert

-- [30]   Foreign Application Priority Data

January 24, 1972    Great Britain........3244/72 --

Signed and sealed this 4th day of March 1975.

(SEAL)
Attest:

RUTH C. MASON
Attesting Officer

C. MARSHALL DANN
Commissioner of Patents
and Trademarks